United States Patent
Shuster et al.

(10) Patent No.: US 11,638,871 B2
(45) Date of Patent: *May 2, 2023

(54) METHOD, SYSTEM AND APPARATUS OF RECORDING AND PLAYING BACK AN EXPERIENCE IN A VIRTUAL WORLDS SYSTEM

(71) Applicant: Utherverse Gaming LLC, New York, NY (US)

(72) Inventors: Brian Shuster, Vancouver (CA); Aaron Burch, Vancouver (CA)

(73) Assignee: Utherverse Gaming LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/512,437

(22) Filed: Oct. 27, 2021

(65) Prior Publication Data

US 2022/0047943 A1 Feb. 17, 2022

Related U.S. Application Data

(63) Continuation of application No. 17/099,444, filed on Nov. 16, 2020, now abandoned, which is a (Continued)

(51) Int. Cl.
*A63F 13/497* (2014.01)
*A63F 13/355* (2014.01)
*A63F 13/60* (2014.01)

(52) U.S. Cl.
CPC .......... *A63F 13/497* (2014.09); *A63F 13/355* (2014.09); *A63F 13/60* (2014.09)

(58) Field of Classification Search
CPC ....... A63F 13/60; A63F 13/355; A63F 13/497
(Continued)

(56) References Cited

U.S. PATENT DOCUMENTS 6,229,533 B1 5/2001 Farmer et al.
8,328,639 B2 12/2012 Nickell et al.
(Continued)

FOREIGN PATENT DOCUMENTS

WO 2008104782 A2 9/2008

OTHER PUBLICATIONS

"Gurubashi Arena Master," (2008), https://www.wowhead.com/wotlk/achievement=389/gurubashi-arena-master.
(Continued)

*Primary Examiner* — Loi H Tran
(74) *Attorney, Agent, or Firm* — Haley Guiliano LLP (57) ABSTRACT

A recorded experience in a virtual worlds system may be played back by one or more servers instantiating a new instance of a scene using one or more processors of the one or more servers and playing back the recorded experience in the new instance by modeling objects of a recorded initial scene state of the recorded experience in the new instance and updating the recorded initial scene state based on subsequent recorded changes over a time period, a recorded experience file includes the recorded initial scene state and the subsequent recorded changes and is stored in one or more memories of the one or more servers. One or more client devices are in communication with the one or more servers to participate in the new instance.

19 Claims, 9 Drawing Sheets

Related U.S. Application Data continuation of application No. 16/525,440, filed on Jul. 29, 2019, now abandoned, which is a continuation of application No. 15/670,926, filed on Aug. 7, 2017, now abandoned, which is a continuation of application No. 14/457,828, filed on Aug. 12, 2014, now Pat. No. 9,724,605.

(58) Field of Classification Search
USPC .......................................................... 386/230
See application file for complete search history.

(56) References Cited

U.S. PATENT DOCUMENTS

| | | | |
|---|---|---|---|
| 9,104,962 | B2 | 8/2015 | Lee et al. |
| 9,364,743 | B2 | 6/2016 | Miura et al. |
| 9,433,868 | B2 | 9/2016 | Nickell et al. |
| 9,555,334 | B2 | 1/2017 | Bernard et al. |
| 9,717,986 | B1 * | 8/2017 | Kawaguchi ............. A63F 13/69 |
| 2003/0008712 | A1 | 1/2003 | Poulin |
| 2003/0115251 | A1 | 6/2003 | Fredrickson et al. |
| 2003/0177187 | A1 | 9/2003 | Levine et al. |
| 2006/0028476 | A1 | 2/2006 | Sobel |
| 2006/0146765 | A1 | 7/2006 | Van et al. |
| 2007/0087829 | A1 | 4/2007 | Liu |
| 2007/0191101 | A1 | 8/2007 | Coliz et al. |
| 2007/0243936 | A1 | 10/2007 | Binenstock et al. |
| 2008/0026838 | A1 | 1/2008 | Dunstan et al. |
| 2008/0140771 | A1 | 6/2008 | Vass et al. |
| 2008/0146338 | A1 | 6/2008 | Bernard et al. |
| 2008/0268961 | A1 | 10/2008 | Brook et al. |
| 2010/0124360 | A1 * | 5/2010 | Hou ..................... G06V 40/173 348/222.1 |
| 2010/0125800 | A1 | 5/2010 | Jana et al. |
| 2010/0211880 | A1 | 8/2010 | Haggar et al. |
| 2011/0055726 | A1 | 3/2011 | Hamilton et al. |
| 2012/0004041 | A1 | 1/2012 | Pereira et al. |
| 2012/0021827 | A1 | 1/2012 | Raitt et al. |
| 2012/0143361 | A1 | 6/2012 | Kurabayashi et al. |
| 2012/0254925 | A1 | 10/2012 | Nassiri |
| 2013/0044106 | A1 | 2/2013 | Shuster et al. |
| 2013/0083062 | A1 | 4/2013 | Geisner et al. |
| 2013/0204852 | A1 | 8/2013 | Han et al. |
| 2013/0344961 | A1 | 12/2013 | Iannetta |
| 2014/0028789 | A1 | 1/2014 | Bentley et al. |
| 2014/0194211 | A1 * | 7/2014 | Chimes ................... A63F 13/95 463/43 |
| 2014/0337734 | A1 * | 11/2014 | Bradford .................. G09B 5/00 715/719 |
| 2015/0050997 | A1 * | 2/2015 | Suzman .................. A63F 13/55 463/31 |
| 2015/0062120 | A1 | 3/2015 | Reisner-Kollmann et al. |
| 2021/0069591 | A1 | 3/2021 | Shuster et al. |

OTHER PUBLICATIONS

"Gurubashi Arena," (2004), https://wowwiki-archive.fandom.com/wiki/Gurubashi_Arena.

"Newbie guide/Picking a Server," https://wowwiki-archive.fandom.com/wiki/Newbie_guide/Picking_a_Server.

Declaration of Benjamin Ellinger Regarding Claim Construction, (Ellinger, Benjamin) (Entered Mar. 24, 2022).

Declaration of Craig S. Rosenberg, Ph.D., (Rosenberg, Craig S., Ph.D.) (Entered Mar. 24, 2022).

Johnnydk, "Gurubashi Arena Booty Run," (Sep. 17, 2020), https://www.ownedcore.com/forums/world-of-warcraft/world-of-warcraft-guides/305992-gurubashi-arena-booty-run.html.

Opening Claim Construction Brief, by Defendant Epic Games, Inc. (Martino-Weinhardt, Matthaeus and McNamara, Antoine M.) (Entered Apr. 28, 2022).

Opening Claim Construction Brief, by Plaintiff Utherverse Gaming LLC (Springer, Colby B.) (Entered Apr. 28, 2022).

Order RE: Claims Construction, (Martinez, Ricardo S.) (dated Oct. 20, 2022).

Responsive Claim Construction Brief, by Defendant Epic Games, Inc. (Martino-Weinhardt, Matthaeus and McNamara, Antoine M.) (Entered May 12, 2022).

Responsive Claim Construction Brief, by Plaintiff Utherverse Gaming LLC (Springer, Colby B.) (Entered May 12, 2022).

Verbatim Report of Proceedings Before the Honorable Ricardo S. Martinez United States District Judge, (Chatelain, Marci E. C.) (Dated Aug. 23, 2022).

Communications Research Group, University of Nottingham. (1999). Massive-3.

Guild Wars Factions Manual (2006) at 81.

Morall, Massive Multiplayer Online Game Architectures (Jan. 23, 2006) at 15.

"Second Life", Linden Labs. (2003). Second Life, https://secondlife.com/.

"StarCraft II: Wings of Liberty Quickstart Guide", Blizzard Entertainment (2010) StarCraft II: Wings of Liberty Quickstart Guide.

"World of Warcraft Game Manual", Blizzard Entertainment. (2004). World of Warcraft: Game manual.

El-Nasr, Seif Magy, et al., "Learning Through Game Modding", El-Nasr, Magy & Smith, Brian. (2005). Learning through Game Modding. Computers in Entertainment—CIE. 4. 10.1145/1111293.1111301., Jan. 2006.

Greenhalgh, Chris, et al., "Temporal Links: Recording and Replaying Virtual Environments", Greenhalgh, C., Purbrick, J., Benford, S., Craven, M., Drozd, A., & Taylor, I. (2000). Temporal links: recording and replaying virtual environments. In MULTIMEDIA '00: Proceedings of the Eighth ACM International Conference on Multimedia, 67-74.

McFarlane, Roger, "Network Software Architectures for Real-Time Massively-Multiplayer Online Games", McFarlane, Roger DP. "Network software architectures for real-time massively multiplayer online games." (2004).

Muller, Jens, "Scaling Online Games on the Grid", Muler, Jens. (2006). Scaling Online Games on the Grid. Conference: In proceedings of Game Design and Technology Workshop 2006.

Rosedale, Philip, et al., "Enabling Player-Created Online Worlds with Grid Computing and Streaming", Rosedale, Philip, and Cory Ondrejka. "Enabling player-created online worlds with grid computing and streaming." Gamasutra Resource Guide (2003): 1-5.

Wagner, Cyrille, Wagner, Cyrille. "Developing Your Own Replay System." Game Developer, Feb. 4, 2004, https://www.gamedeveloper.com/programming/developing-your-own-replay-system.

Motion to Dismiss for Failure to State a Claim, filed by Defendant Epic Games Inc. Oral Argument Requested. (Attachments: #1 Proposed Order) Noting Date Aug. 27, 2021, (McNamara, Antoine) (Entered: Aug. 5, 2021).

Reply, filed by Defendant Epic Games Inc. to Response to 34 Motion To Dismiss for Failure to State a Claim (McNamara, Antoine) (Entered: Sep. 10, 2021).

Response, by Plaintiff Utherverse Gaming LLC, to 34 Motion to Dismiss for Failure to State a Claim Oral Argument Requested. (Hood, Gary) (Entered: Sep. 1, 2021).

Motion for Reconsideration of Dkt. 133 (LCR 7(h)), filed by Plaintiff Utherverse Gaming LLC, Note on Motion Calendar: Nov. 3, 2022 (Andrade, Jessica M. and Deming, Mark T.) (Entered Nov. 3, 2022).

Order Denying Motion for Reconsideration, (Martinez, Ricardo S.) (Dated Nov. 15, 2022).

Response, by Defendant Epic Games, Inc. to Plaintiff's Motion for Reconsideration of Dkt. 133 (LCR 7(H)) (Martino-Weinhardt, Matthaeus and McNamara, Antoine M.) (Dated Nov. 10, 2022).

A Distributed Architecture for MMORPG, Marios Assiotis; Velin Tzanov NetGames '06: Proceedings of 5th ACM SIGCOMM workshop on Network and system support for games, Oct. 2006.

A Distributed Multiplayer Game Server System, Eric Cronin, Burton Filstrup, Anthony Kure, Electrical Engineering and Computer Science Department University of Michigan, May 4, 2001.

A peer-to-peer simulation technique for instanced massively multiplayer games, Cecin et al. 2006 Tenth IEEE International Symposium on Distributed Simulation and Real-Time Applications.

(56) References Cited

OTHER PUBLICATIONS

A Scalable Dynamic Load Distribution Scheme for Multi-Server Distributed Virtual Environment Systems With Highly-Skewed User Distribution, Lee et al., VRST '03: Proceedings of the ACM symposium on Virtual reality software and technology Oct. 2003.
An Efficient Synchronization Mechanism for Mirrored Game Architectures, Cronin et al., Multimedia Tools and Applications, 2004.
Colyseus A Distributed Architecture for Online Multiplayer Games, Ashwin Bharambe; Jeffrey Pang; Srinivasan Seshan, NSDI '06: 3rd Symposium on Networked Systems Design & Implementation.
FreeMMG: A Scalable and Cheat-Resistant Distribution Model for Internet Games, Cecin et al. Eighth IEEE International Symposium on Distributed Simulation and Real-Time Applications Oct. 21-23, 2004.
Greenhalgh et al., "Applications of Temporal Links: Recording and Replaying Virtual Environments'," School of Computer Science and IT, University of Nottingham; 8 Pages; Issn 1087-8270/02; IEEE Virtual Reality, Computer Society; United States.
Issues in the Design of Large-scale Shared Networked Worlds Roncancio et al. Year: 2000, vol. 1, pp. 158.
P2PSE project partially decentralized simulation for instanced MMOGs, Cecin et al. Universidade Federal do Rio Grande do Sul Instituto de Inform'atica 2006.
Questing for Knowledge—virtual worlds as dynamic processes of social interaction, Mikael Jakobsson, R. Schroeder & A.S. Axelsson (Eds.), Avatars at Work and Play, 209-225 (2006).
Rokkatan: scaling an RTS game design to the massively multiplayer realm, Jens Muller, Sergei Goriatch, Computers in Entertainment Jul. 2006.
Sewing Worlds Together With SEAMS, Schmalstieg et al., PRESENCE: Virtual and Augmented Reality, 8(4)449-461(1999) (13 pages).
Burlamaqui, et al., A Scalable Hierarchical Architecture for Large Scale Multi-User Virtual Environments, 2006 IEEE Symposium on Virtual Environments, Human-Computer Interfaces and Measurement Systems.
McCahill, et al., "Design for an extensible Croquet-based framework to deliver a persistent, unified, massively multi-user, and self-organizing virtual environment", Proceedings. Second International Conference on Creating, Connecting and Collaborating through Computing, 2004.

\* cited by examiner

METHOD, SYSTEM AND APPARATUS OF RECORDING AND PLAYING BACK AN EXPERIENCE IN A VIRTUAL WORLDS SYSTEM

CROSS-REFERENCE TO RELATED APPLICATION

This application claims priority to and is a continuation of U.S. patent application Ser. No. 17/099,444, filed on Nov. 16, 2020, which is a continuation of U.S. patent application Ser. No. 16/525,440, filed on Jul. 29, 2019, which is a continuation of U.S. patent application Ser. No. 15/670,926, filed on Aug. 7, 2017, which is a continuation of U.S. patent application Ser. No. 14/457,828, filed on Aug. 12, 2014 (now U.S. Pat. No. 9,724,605, issued Aug. 8, 2017), which applications are hereby incorporated by reference in their entireties. This application is related to the following application: PCT Application Serial No. PCT/CA2015/050745, filed Aug. 6, 2015, which is incorporated herein by reference in its entirety.

FIELD OF INVENTION

The present disclosure relates to virtual computer-generated environments through which users are able to navigate.

DESCRIPTION OF THE BACKGROUND

Computer generated virtual environments are increasingly popular methods for people, both real and automated, to interact within a networked system. Various on-line environments are known in which a three-dimensional, 2.5-dimensional or two-dimensional physical world (actual or fantasy) is simulated. Environments of this type are sometimes referred to as "virtual reality" or "virtual reality universe" (VRU) environments. In known VRU environments, an actual or fantasy universe is simulated within a computer memory. Multiple players may participate in the environment through a computer network, such as a local area network or a wide area network. Each player is typically represented by an "avatar," which may comprise a figure of a man, woman, or other being, to represent them in the VRU environment. Players send inputs to a VRU engine to move their avatars around the VRU environment, and are able to cause interaction between their avatars and objects in the VRU. For example, a player's avatar may interact with an automated entity or person, simulated static objects, or avatars operated by other players.

It is possible to record a state of a VRU environment so that users may log out of the VRU and, upon their return, resume an activity at the point where they left off. For example, when playing chess, users may take a break and return to the same chess board at a later time.

It may be desirable to replay a scene that occurred in a VRU environment, such as a concert, a wedding or a lecture, for example.

SUMMARY OF THE INVENTION

In an aspect of the present disclosure, there is provided, a method of playing back a recorded experience in a virtual worlds system, comprising: instantiating, using one or more processors of a server, a new instance of a scene, the new instance being defined by data stored in memory, at least one client device displaying and participating in the new instance; retrieving a recorded experience file from the memory, the recorded experience file having been generated by saving an initial scene state and saving subsequent changes and respective times during a time period of the recorded experience; and playing back the recorded experience file by rendering, for display by the at least one client device, objects of the initial scene state in the new instance and rendering updates to the initial scene state based on the subsequent changes over the time period.

In another aspect of the present disclosure, there is provided a virtual worlds system for playing back a recorded experience, comprising: one or more servers instantiating a new instance of a scene using one or more processors of the one or more servers and playing back a recorded experience in the new instance by rendering objects of a recorded initial scene state of the recorded experience in the new instance and rendering updates to the recorded initial scene state based on subsequent recorded changes over a time period, one or more recorded experience files comprising the recorded initial scene state and the subsequent recorded changes being stored in memory of the one or more servers; and one or more client devices in communication with the one or more servers, the one or more client devices participating in the new instance. In another aspect of the present disclosure, there is provided an apparatus for playing back a recorded experience in a virtual worlds system, comprising: one or more processors of a server system for instantiating a new instance of a scene and for communicating with one or more client devices participating in the new instance; memory of the server for storing one or more recorded experience files, the one or more recorded experience files having been generated by saving an initial scene state and saving subsequent changes and respective times during a time period of the recorded experience; wherein the processor plays back the recorded experience file in the new instance by rendering objects of the initial scene state in the new instance and rendering updates to the initial scene state based on the subsequent changes over the time period.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present application will now be described, by way of example only, with reference to the attached Figures, wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Figure 1:
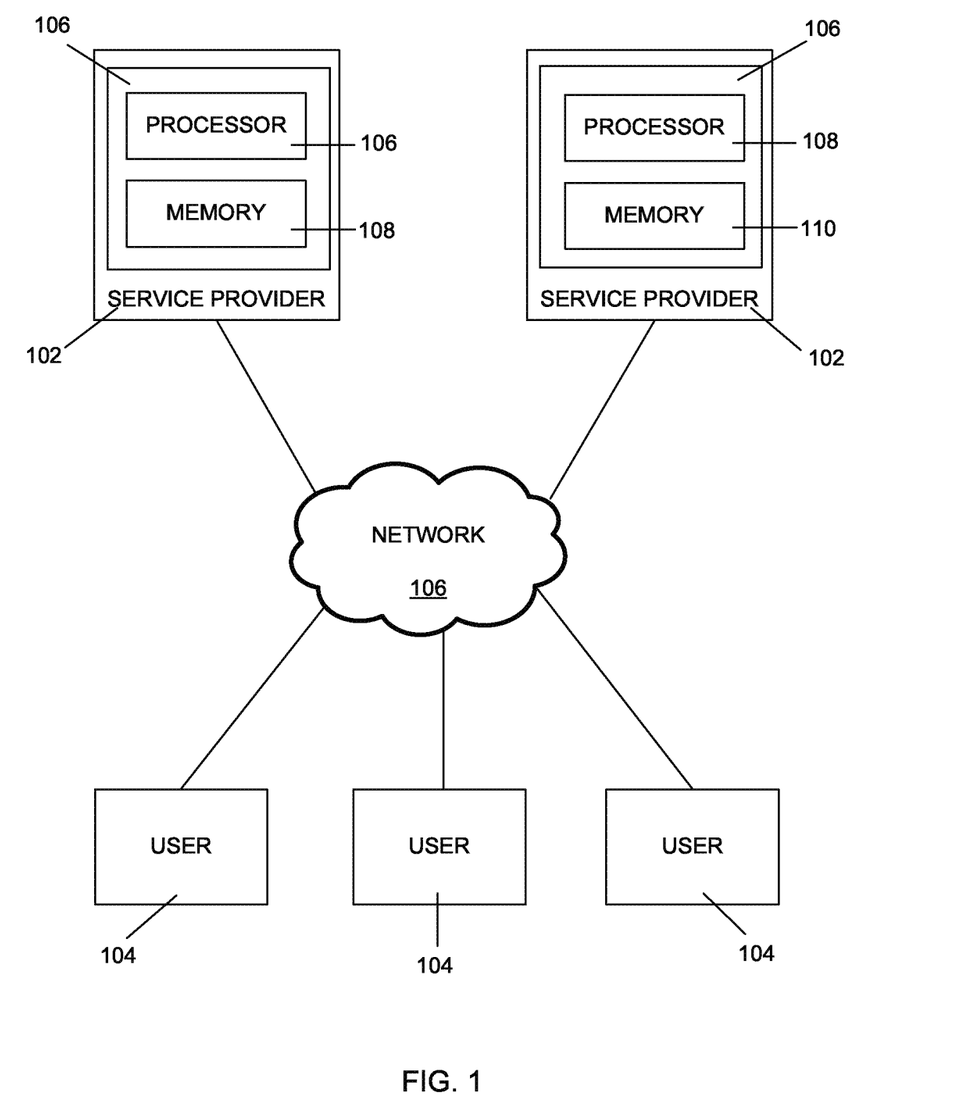
FIG. 1 is a block diagram of an example computer network system connecting virtual worlds service providers and users.

Referring to FIG. 1, a computer network system 100 connects virtual world service providers 102 with users 104 via a network 106. The computer network system 100 is capable of rendering a VRU environment and managing changes to the VRU environment resulting from user participation in the VRU environment. Examples of virtual worlds software usable to render and participate in virtual worlds include Curio™ by The Virtual World Web Inc. and Second Life™.

Service providers 102 include computing devices and systems offering virtual worlds services. Service providers 102 may include computing hardware and/or software configured to perform one or more of the processes described herein. In an embodiment, multiple service providers 102 may be housed on a single computing device. Service providers 102 may also be distributed across multiple devices, as in cloud computing or distributed systems.

In an embodiment, which is depicted in FIG. 1, each service provider 102 is hosted on a server 106 that includes a processor 108 and a memory 110. According to another embodiment, in order to use the computational ability of the computer network system 100 as a whole, some functions of the server(s) may be provided by the users. This distributed computing structure may allow for more powerful computational abilities, as the full computer power of all users may be utilized to provide some or all server functions to the network. In this embodiment, some or all of the users may function as both clients and servers. Service providers 102 communicate via one or more networks 106 with users 104. The networks 106 may include, for example, Internet networks, cellular networks, local area networks, wide area networks, wireless networks, Ethernet networks, and so on, as well as combinations thereof. Users 104 may include user computing devices, such as desktop computers, laptop computers, mobile computing devices, mobile phones and tablets, for example. The term "user" throughout this specification may be used to refer to a user device such as the aforementioned and/or an entity, such as an individual, operating such a device, as appropriate to the context of the term. In an embodiment, users 104 operate.

Additional devices and systems may be included in the system of FIG. 1. For example, service providers 102 may communicate with common data stores, such as account databases, registration or authentication servers and management servers, for example. Such use of centralized systems may allow service providers 102 to easily synchronize and coordinate among each other, for example, to coordinate avatar location transitions, to synchronize user accounts, and so on.

Figure 2:
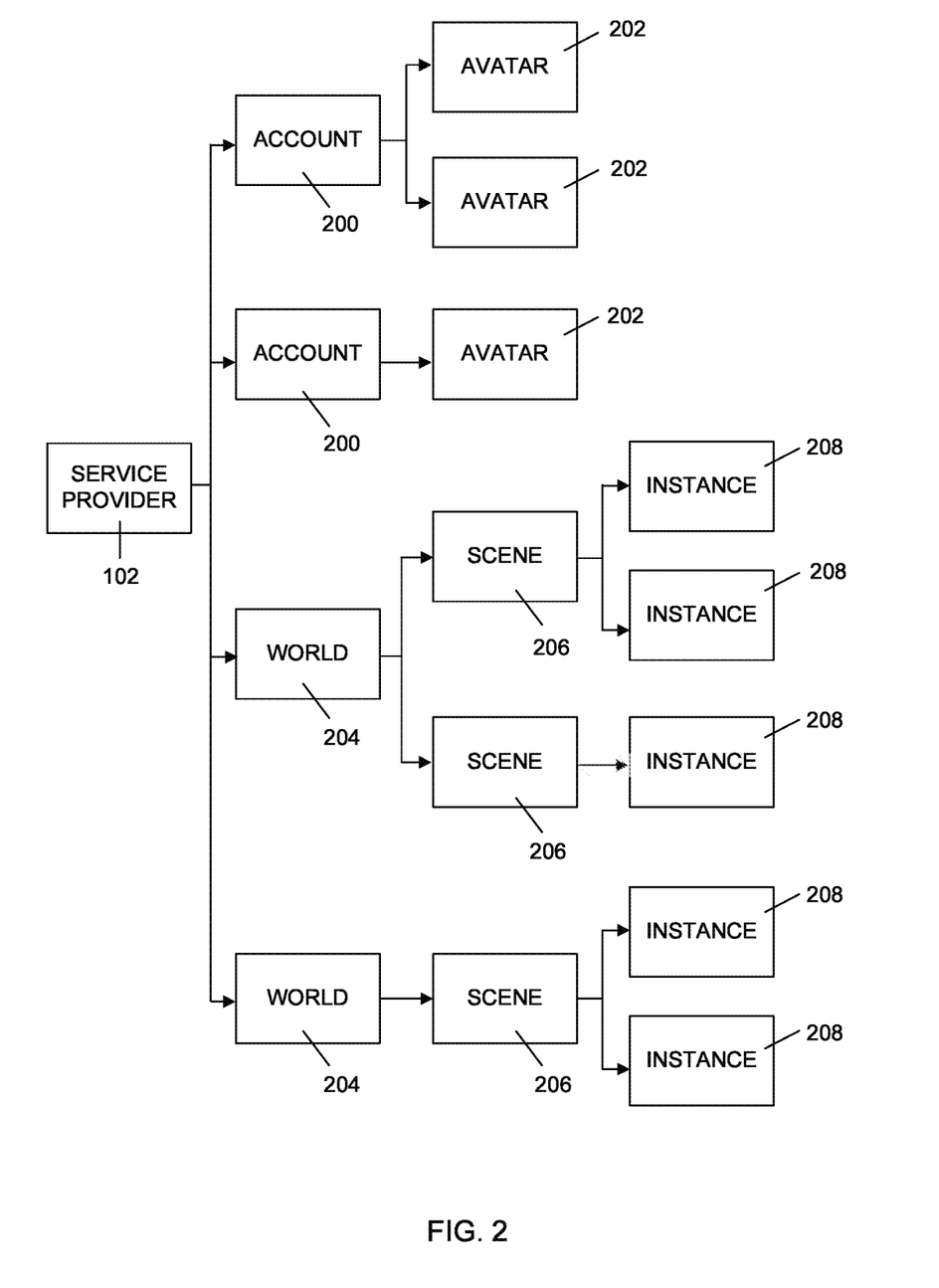
FIG. 2 is a diagram showing an example arrangement of virtual worlds data on a service provider, as used in an embodiment.

FIG. 2 shows an example arrangement of virtual worlds data, as used in an embodiment. The blocks represent types of data objects, and interconnections may represent relationships among the data elements, such as pointers, references, subclass relationships, or the like. Data structures may be stored on computer-readable media of the server system 102, for example, such as a hard drive, SSD, tape backup, distributed storage, cloud storage, and so on, and may be structured as relational database tables, flat files, C structures, programming language objects, database objects, and the like. In various embodiments, additional elements may be included, some elements may be removed, and/or elements may be arranged differently from what is shown. Service provider 102 may be represented as a data object with general data relating to the service provider. The service provider 102 may maintain accounts 200 for users of the service provider. The account objects 200 may include relevant data relating to users, such as usernames, authentication information, attribute information, personal information, and so on. Each account may further be associated with one or more avatars 202, which the user may select for appearing in a virtual world. The service provider 102 may allow users to maintain multiple avatars, may restrict users to a single avatar or may allow users to navigate through a VRU as observers with no avatar, in various embodiments. When allowing users 104 to maintain multiple avatars, a service provider 102 may allow users to take on different appearances and personas in different situations, as selected by the users 104 and/or the service provider 102.

The service provider 102 may further maintain worlds 204. Each world 204 may represent a virtual space in which avatars may interact. The service provider 102 may maintain multiple virtual worlds 204, and each virtual world 204 may be operated by different users 104 or administrators of service provider 102.

Virtual worlds 204 may in turn include scenes 206. Scenes 206 represent virtual locations where users may visit and enter. A scene 206 may be defined by various attributes such as appearance, size, furniture, included items, architecture and so on. Scripts may also be included as part of the scene 206. Scripts are generally software based instructions that, when executed, result in changes to the scene 206. Scripts may be executed in response to user actions, may be executed at specified times, or may be executed in response to trigger events. For example, curtains covering a stage may be opened in response to an avatar pulling a cord, may be opened when a concert start time is reached or may be opened when the capacity of the concert venue reaches a predetermined size.

In some situations, it may be desirable to have a single scene 200 available but have avatars enter different copies of that scene. Such copies are implemented by instances 208. An instance 208 represents a running version of a scene, and users 104 interact within instances 208 of scenes 206. In an embodiment, the computer network system 100 includes one or more servers in communication with the service providers 102 to operate as instance hosts that run the instances 208. The service provider 102 may use rules specified for a particular scene 206 in order to determine when to create a new instance. For example, one may create a scene arranged to appear like a virtual tennis court, and it may be desirable for pairs of tennis players to be provided distinct copies of the scene rather than making all players use the same virtual space. So, a new instance would be initiated each time a pair of tennis players enters the virtual tennis court and instances that are currently running have reached capacity.

New instances may also be created based on time intervals, avatar user requests, availability of objects within each instance, and so on. In one embodiment, an environment may automatically change, or the avatars may be automatically transported, when a threshold event takes place. For example, avatars waiting to play poker may be automatically transported to the poker room when eight avatars have signed up for the table. In another example, a prospective tennis player may wait in a waiting room until another tennis player arrives and the waiting room is transformed into a tennis court.

Instances may originally be configured based on the specification of the underlying scene. For example, a newly created instance may be arranged to have the same contained items, the same appearance, the same size, the same scripts and so on, with respect to the scene. In alternate embodiments, the scene may include instructions that randomize or otherwise alter the nature of each new instance. As users interact with an instance of a scene, those avatars may cause changes to the contained items, appearance, and so on.

Such changes may or may not be reflected back to the original scene, to other copies of the scene or other instances of the scene, possibly depending on the configuration of the scene. Additionally, in an embodiment, new instances may be based on existing instances, rather than being based on the original scenes.

Within a service provider, worlds 204, scenes 206, and instances 208 may be represented as data structure objects, such as document objects, for example. The document objects are encoded in a descriptive language and define respective 3-D, 2.5-D or 2-D modeled objects or spaces. Service providers may include software modules to convert these objects to graphical or other representations. The software may be operated on the service provider to generate those representations. Additionally or alternately, client software operating on user devices may perform the translation of data structure objects to graphical representations.

In order for one or more users to interact in a virtual world, the system 100 instantiates, in memory, an instance of a scene defined by a collection of document objects. The service provider 102, or another system component, controls contents of the collection of document objects in response to signals received at one or more processors from one or more client devices of the users 104. The service provider 102, or another system component, receives, at one or more processors, data requesting changes to an instance of a scene including at least position and orientation of objects modeled in the scene. Data representing the changes is then provided to the one or more users so that an event playing out in an instance of a scene may be experienced in substantially real time by users 104.

Figure 3:
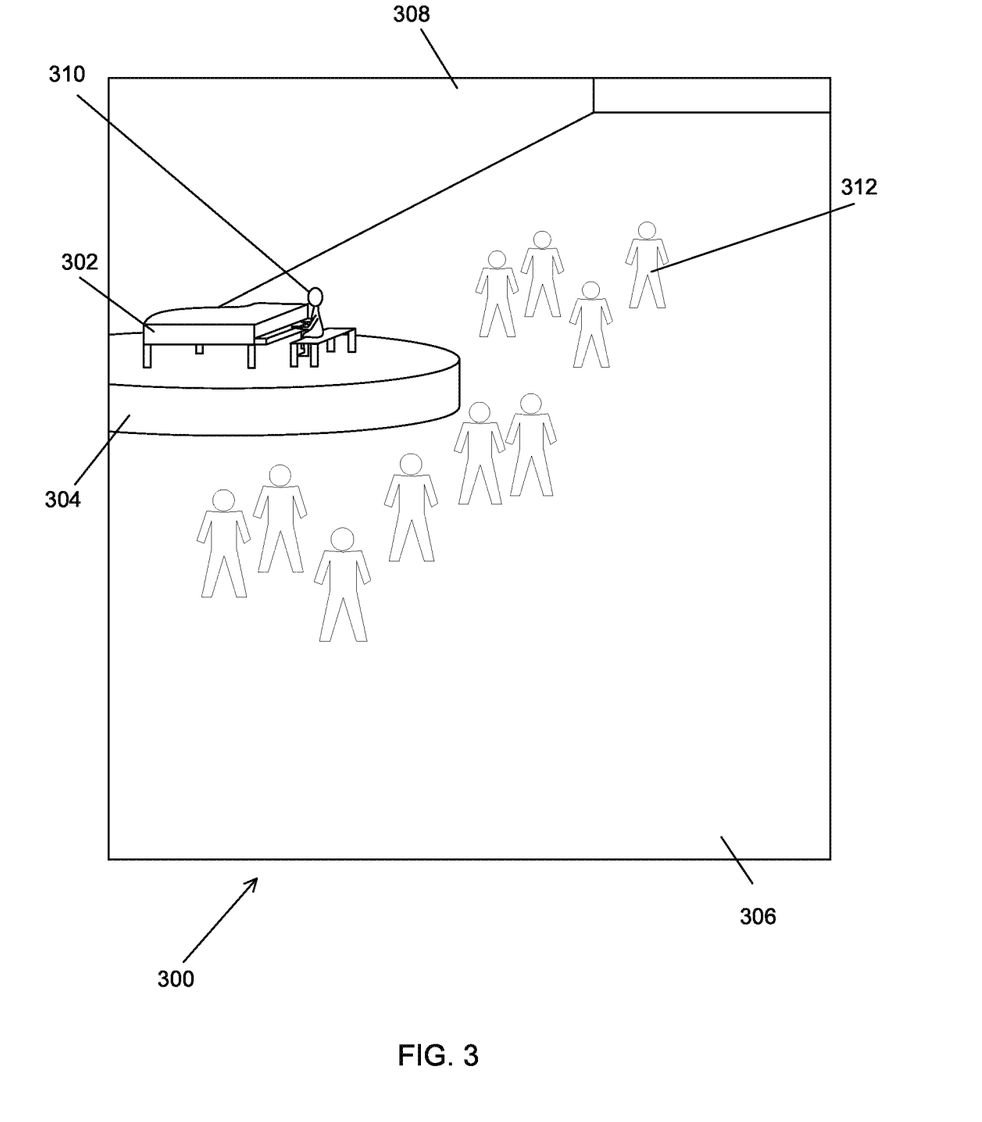
FIG. 3 is an example screen shot of a user interface in which a recorded experience is being played back.

Referring to FIG. 3, an example of a scene 300 that has been instantiated by the service provider 102 is shown. In this example, the scene 300 is a performance venue including a floor 306 and walls 308 and a piano 302 located on a stage 304 that is rendered for display at a user 104. Also rendered for display are: a performer avatar 310 is located on the stage 304 and an audience that includes avatars 312 that surround the stage to view the performance.

Figure 4:
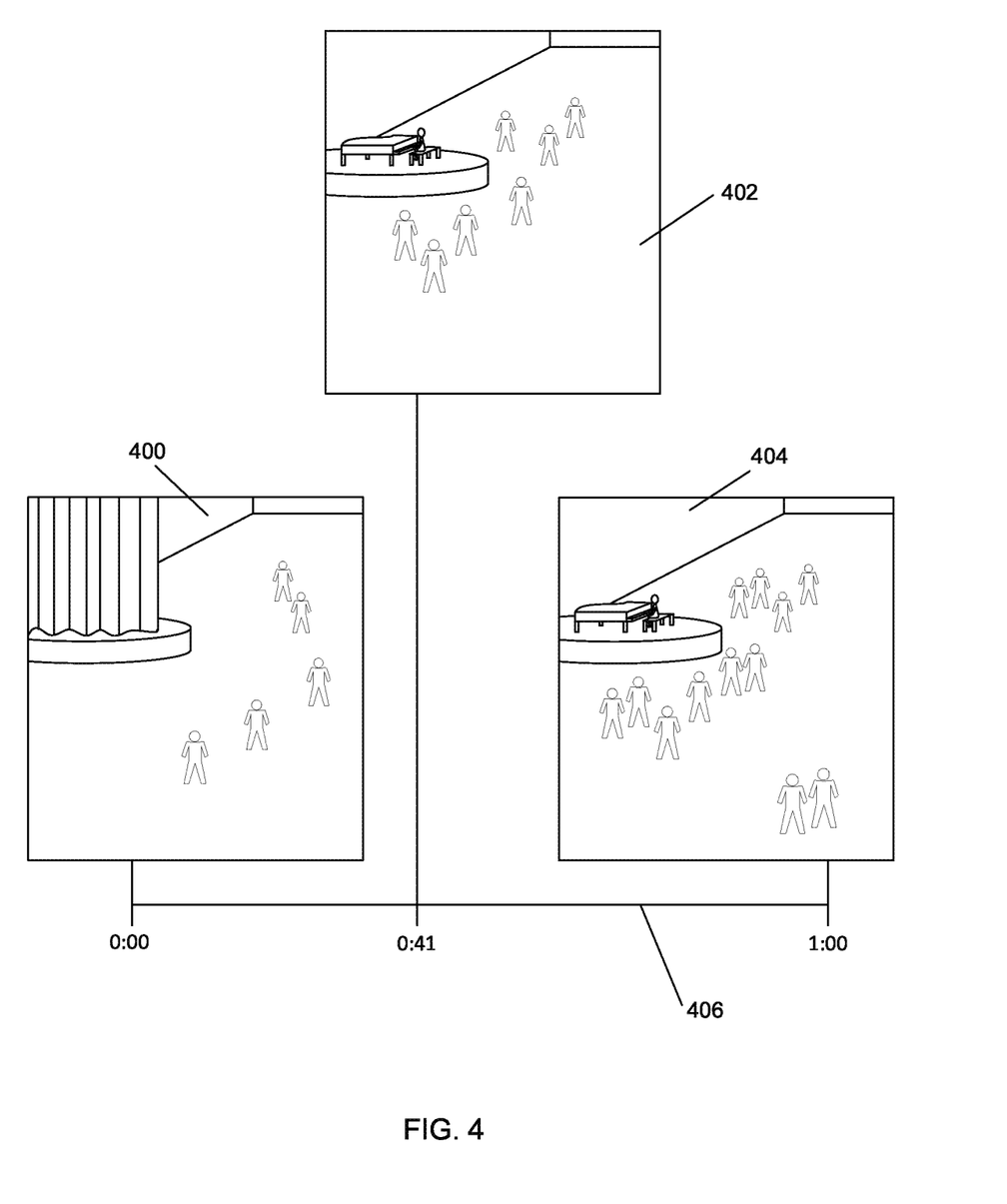
FIG. 4 is a schematic diagram showing example screen shots of a user interface in which a recorded experience is being played back over a time period.

FIG. 4 schematically shows the scene 300 as it changes over time from an initial state 400 at the beginning of a time period, to an intermediate state 402 and to a final state 404 at the end of the time period. As shown, an elapsed time at which each scene state occurs, measured from the initial state, is indicated on timeline 406. In another embodiment, the changes from the initial state 400 are stored as a series of frames, which are recorded at regular intervals, such as approximately every 0.01667 seconds, for example, which results in 60 frames per second being recorded. In one example of this embodiment, the frames are recorded regardless of whether changes to the scene have occurred.

Figure 5:
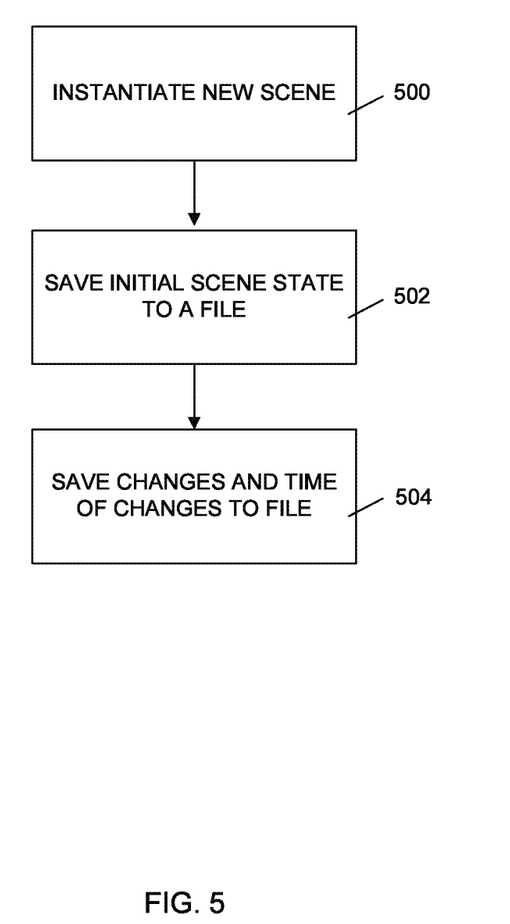
FIG. 5 is a method of recording a scene according to an embodiment.

Any VRU experience, such as the performance depicted in FIGS. 3 and 4, for example, may be experienced by users 104 in substantially real time and may be recorded to be experienced at a later time. A method of generating a recording of a VRU experience is shown in FIG. 5. The method may be carried out by software executed by one or more processors of the computer network system 100 and stored as computer-readable code in a computer-readable medium. Coding of software for carrying out such a method is within the scope of a person of ordinary skill in the art given the present description.

According to the method, a new scene is first instantiated at 500. Then, the service provider 102, or another component of the system 100, saves, to an initial scene file stored at the one or more memories, an initial scene state, at 502. The initial scene state includes at least a position and orientation of objects, including avatars, rendered in the scene at a beginning of a time period of a new recording. Changed scene states result after a change to the initial scene state or to a previous changed scene state has occurred. Changes to the initial scene state and subsequent changed scene states, are saved to a recorded experience file, at 504. The initial scene state and the changes may be saved as data structure objects, such as document objects, for example, that are encoded in a descriptive language to define the objects of the scene. In an embodiment, the initial scene file and the recorded experience file are the same file.

Every change may be saved along with a time at which the change occurred or only some changes may be saved. In an embodiment, changes may be saved at selected intervals over the time period so that a complete recording may be generated by interpolating between the changes at the selected intervals.

Changes may be saved in response to avatar movements and interactions between objects, for example. Changes may also be saved in response to initiation of electronic messaging or webcam interactions between users, for example. In this example, a chat interaction or a video interaction may be captured and stored as a separate file accessible when the saved changes are played back. In addition, alterations to object appearance and behavior resulting from plug-in applications, or images or video inserted into the scene may also be saved as changes or in a separate file accessible when the saved changes are played back.

The VRU experience may be recorded in its entirety or, alternatively, only selected portions may be recorded. For example, walls of a scene may not be recorded in order to allow for expansion of a room, for example, when the recorded experience is played back. Further, avatars that are friends of a user may be recorded and avatars that are not known to a user may not be recorded or a lecturer may be recorded for future playback but the audience may not be recorded. Selecting only a portion of an instance of a scene to record has several advantages including: conserving memory, avoiding potential copyright issues and preserving privacy, for example.

Figure 6:
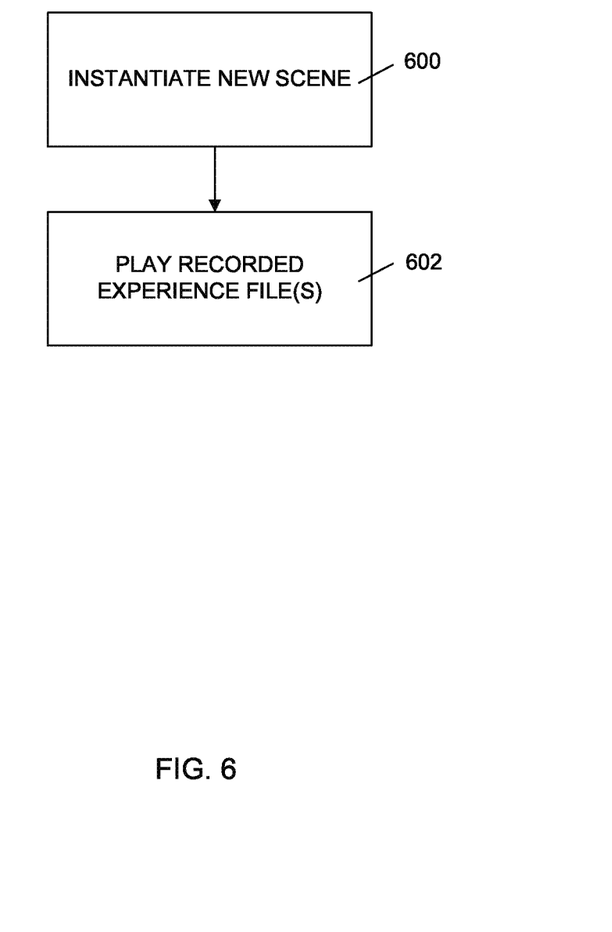
FIG. 6 is a method of playing a recorded experience, according to an embodiment.

When a recorded experience, which may also be referred to as a video experience or Vidience™ is played back, a user is able to navigate around recorded objects, as an observer or as an avatar, as if navigating through the original scene. Depending on the contents of the recorded experience file, the user may also see alterations to object appearance and behavior available from plug-in applications, listen to audio and view chats, video and images, for example. A method for playing back the recorded experience is shown in FIG. 6. The method may be carried out by software executed by one or more processors of the computer network system 100 and stored as computer-readable code in a computer-readable medium. Coding of software for carrying out such a method is within the scope of a person of ordinary skill in the art given the present description.

According to the method, an instance of a new scene is first instantiated, at 600, using one or more processors of the computer network system 100. The new instance is defined by data stored in memory. The new scene may include nothing at all with all objects being drawn into the blank space from the recorded experience. Alternatively, the new scene may be include at least some boundaries but be empty of objects when instantiated or, optionally, objects of the new scene may be hidden. The recorded experience file(s) is then retrieved from memory and played back within the new scene, at 602, by rendering, at the service provider 102 for display at a client device, objects of the initial scene state in the new instance and rendering updates to the initial scene state based on the subsequent changes over the time period.

The objects of the recorded experience are displayed in the new scene such that, similar to when the recorded experience was experienced the first time, objects and boundaries of the recorded experience are present. A user, by controlling an avatar via a user interface at a client device, may navigate through the recorded experience and interact with other avatars also participating in the playback of the recorded experience. As indicated at 602, more than one recorded experience may be played back at the same time.

In an embodiment, a collection of document objects represents the new scene and the recorded experience file. The service provider 102, or another system component, controls contents of the collection of document objects in response to communications received at one or more processors from one or more client devices of the users 104. The service provider 102, or another system component, receives data requesting changes to the instance of the new scene including at least position and orientation of objects in the new scene. Data representing the changes is then provided to the one or more users so that an event playing out in the instance of the new scene may be experienced in substantially real time by users 104. The recorded experience is not modifiable by events occurring during playback.

In another embodiment, a first collection of document objects represents the new scene and a second collection of document objects represents the recorded experience. In this embodiment, the new scene and the recorded experience are layered upon one another by the service provider 102 or at the client device. Any conflicts between the first and second collections, such as objects occupying the same location, for example, are resolved at by the service provider 102 or at the client device. Data requesting changes to the instance of the new scene is received by the service provider 102 and data representing the changes is then provided to the one or more users so that an event playing out in the instance of the new scene may be experienced in substantially real time by users 104. Similar to the previous embodiment, the recorded experience is not modifiable by events occurring during playback. A recorded experience may be replayed in response to a user request to a service provider 102, may be replayed periodically at selected time intervals or may be replayed in response to a number of users waiting to participate in the recorded experience reaching a threshold.

Users may join a new scene at any point during playback of the recorded experience. In this way, users may join other users at their point in the playback of the recorded experience. Alternatively users may be able to instantiate their own new scene and playback the recorded experience.

In an embodiment, in order for users navigating through a recorded experience to feel as though they are experiencing the original scene, collisions are set to occur when objects such as avatars, for example, of the new scene attempt to occupy the same location as objects, such as avatars, for example, of the recorded experience. In an alternative embodiment, collisions between objects of the new scene and objects of the recorded experience may be turned off. In this way, objects of the new scene may pass through objects of the recorded experience. This may be useful when the recorded experience is crowded and the avatars of the new scene are attempting to move across a room, for example.

In an embodiment, objects including avatars may be marked for non-recording. The objects may be marked for non-recording in response to user opt-out instructions or copyright issues, for example. Objects that are not recorded may be substituted with another object during playback of the recorded experience. In a further embodiment, replacement objects, such as anonymous bot avatars, for example, may be substituted for non-recorded avatars during playback of the recorded experience. According to the example, bots may be included to fill empty seats of avatars that are not recorded, due to opt-out, for example, at a concert or other event. Replacement of the objects that have opted out may be based on selection or may be automated.

In another embodiment, private messages may be saved. Private messages may enhance playback of a recorded experience. For example, private message between a student and an assistant professor during a lecture, may remind the student of additional information obtained during the lecture. Alternatively, the sender and/or the recipient may unmark the messages as private. Private messages may be viewable by all users when a recorded experience is played back or by the sender and recipient of the private messages only. In an alternative embodiment, private messages may not be saved and instead, metadata may be substituted for private messages so that users viewing the recorded experience may be made aware that private messages were sent but are not able to view the contents of the private messages.

Figure 7:
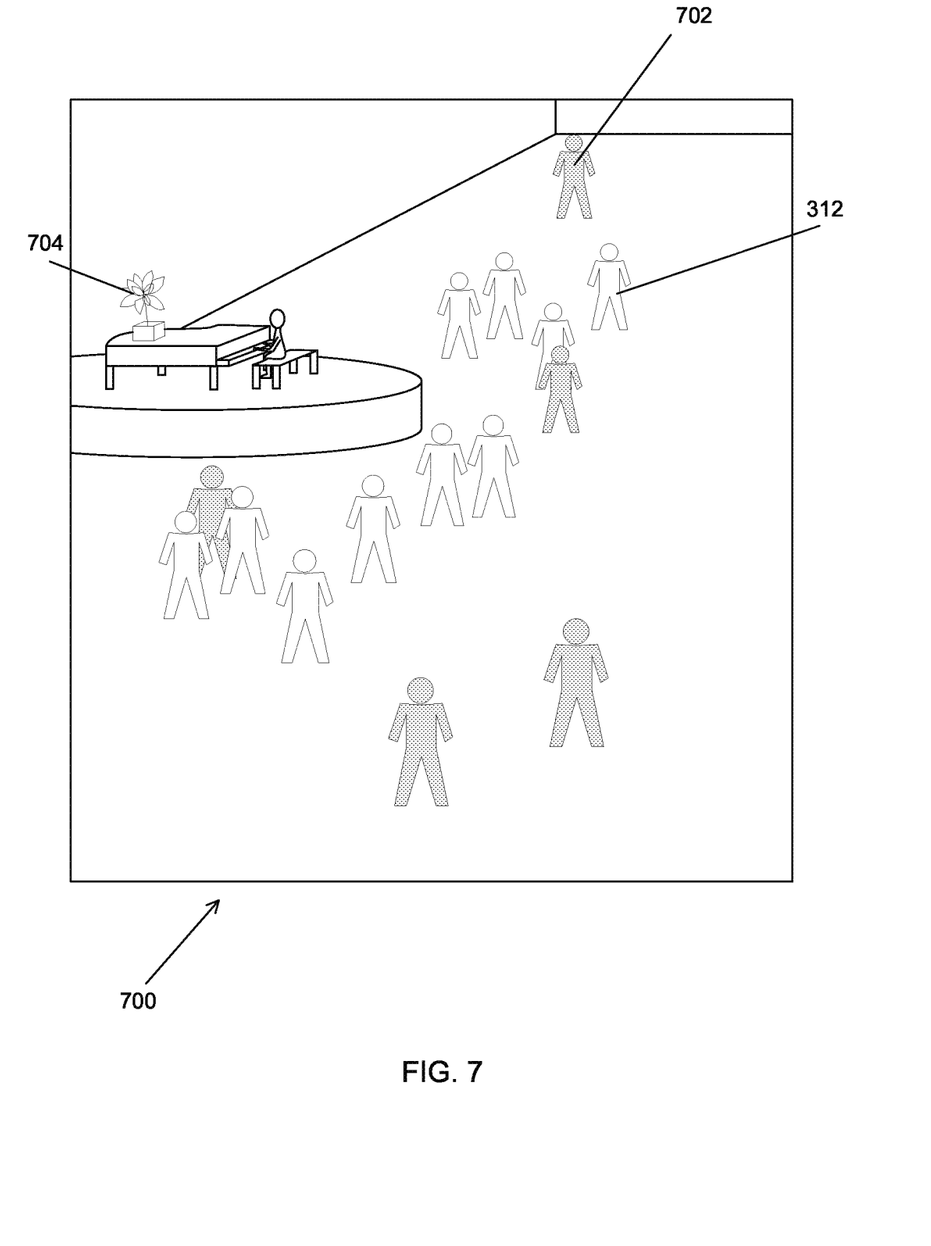
FIG. 7 is another example screen shot of a user interface in which a recorded experience is being played back.

Also referring to FIG. 7, a single recorded experience is played back in a new scene 700 and visiting users, represented by avatars 702, are able enter the new scene 700 when the recorded experience is playing and navigate around the recorded experience. As shown, all of the recorded objects are present as the visitor avatars 702 move through the new scene 700. As such, the visitor avatars 702 are able to experience the scene as it was experienced by the users who were present during the original scene.

When a new scene is instantiated, the new scene may include nothing at all, may include some boundaries but be empty of objects or may include some objects. In the example of FIG. 7, the new scene 700 includes a plant object 704 that was not present in the recorded event. The visitor avatars 702 may move through the scene 700, interact with one another, interact with other objects belonging to the new scene 700 and communicate via electronic messages or webcam, for example. Further, when a new scene is instantiated, the new scene may include scripts that are layered at locations where scripts from the recorded experience were available. This allows the recorded experience to maintain functionality that was available in the original scene that was recorded.

Figure 8:
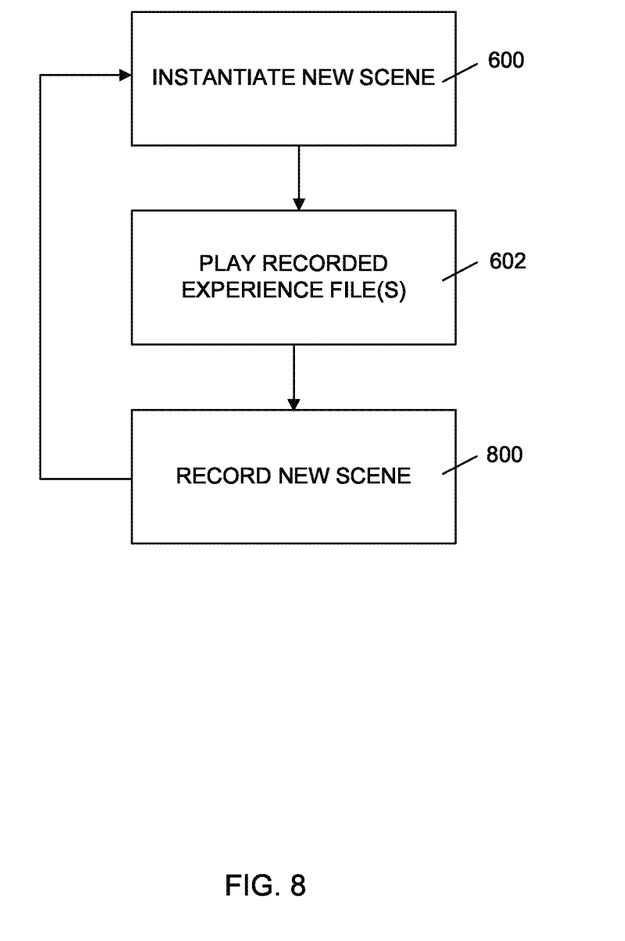
FIG. 8 is another method of playing a recorded experience, according to an embodiment.
Figure 9:
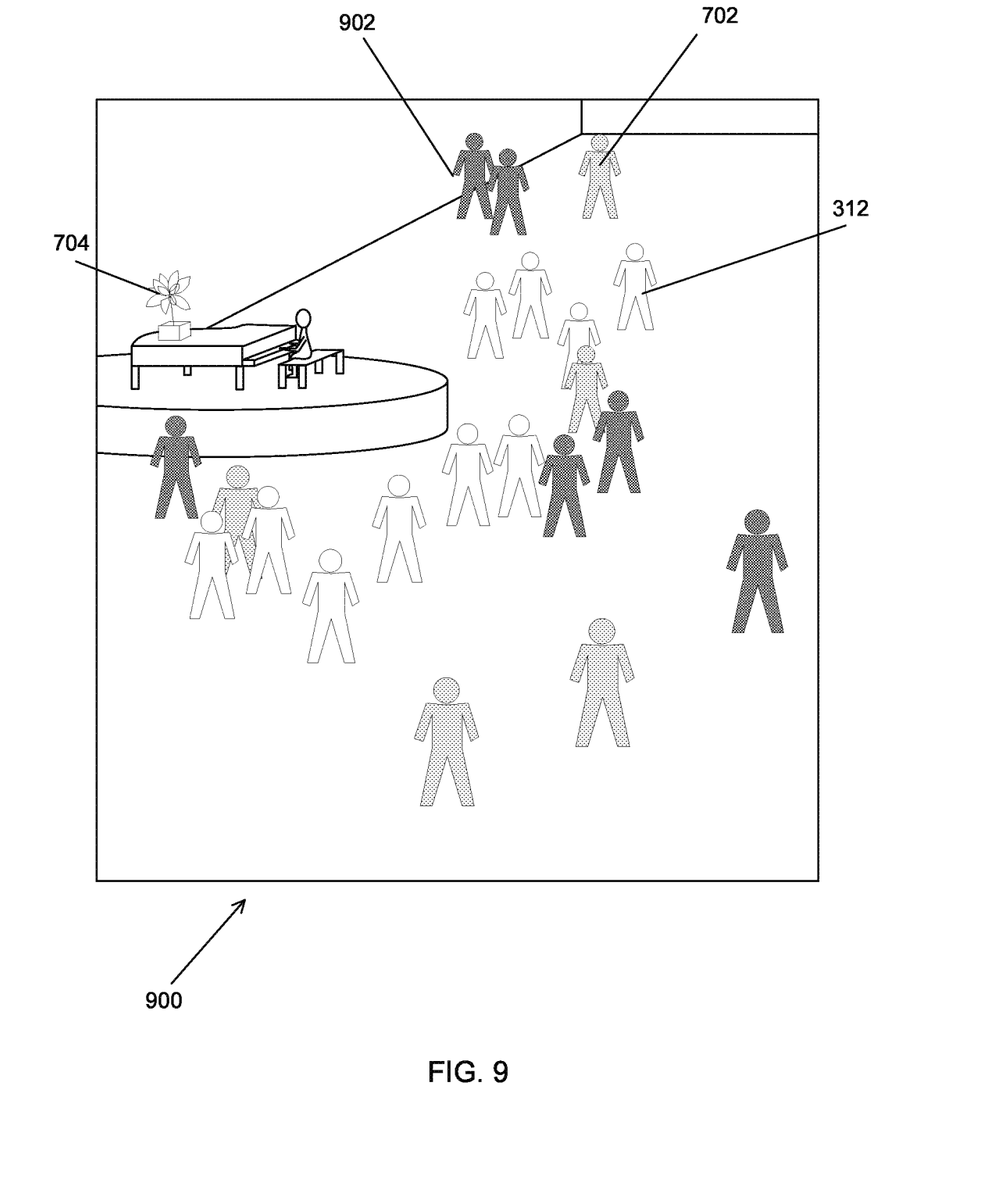
FIG. 9 is another example screen shot of a user interface in which a recorded experience is being played back.

Referring to FIG. 8, according to another embodiment, the new scene, in which the recorded experience is being played, may be recorded, as indicated at 800. After the new scene has been recorded and a new recorded experience file saved, the new recorded experience may be played back, as described with respect to FIG. 6. The new recorded experience will only include elements from the new scene. Recorded experiences may be "layered" on top of one another each time an original scene is re-played. For example, as shown in FIG. 9, the original performance event of scene 300 and the performance event of scene 700 are layered and a new scene 900 is instantiated according to the method of FIG. 7. Avatars 902 are visitors to the new scene 800 and may interact with one another. According to another embodiment, a single new recorded scene file may be generated that merges the original recorded experience with one or more subsequent recorded experiences. The method of FIG. 8 may be carried out by software executed by one or more processors of the computer network system 100 and stored as computer-readable code in a computer-readable medium. Coding of software for carrying out such a method is within the scope of a person of ordinary skill in the art given the present description.

In one example, the system and method described herein is used for film production. An environment of a film, such as waves crashing on a beach, may be recorded in a first recorded experience. Extra actors may be recorded in a second recorded experience while the environment scene is played back. Finally, main actors may be recorded in a third recorded experience that is layered on the first recorded experience and second recorded experience to provide an animated storyboard or even a final film.

In the figures of the present description, the avatars of recorded experiences are differentiated from one another in order to aid in the understanding of the subject matter described herein. The avatars may instead appear similar to one another so that it is not readily apparent which avatars are from a recorded experience and which avatars are participating in the current scene. It may, however, be advantageous to visually or otherwise distinguish avatars participating in a current scene from avatars in a recorded experience. According to one embodiment, the avatars of a current scene may be rendered with a different degree of shading, different color, different type of clothing or a different theme, for example, than the avatars of a recorded experience. Alternately, the avatars of a current scene may appear in outline, or semi-transparent so that they appear as ghosts. Avatars of a recorded experience may be shown as transparent and may become more and more transparent to indicate how long ago they visited the scene. By visually distinguishing between current users and recorded objects, current users are able to locate one another more easily so that they may interact with one another. Other methods for distinguishing objects that may be interacted with in a currently scene may be provided. For example, recorded objects may be ghosted, semi-transparent or haloed. Alternatively, objects of a recorded experience may be in black and white while avatars visiting a current scene may be in colour. Avatars participating in a current scene from avatars in a recorded experience may be distinguished from one another using audio, may appear the same and only be distinguished from one another in response to a mouse-over action by the user. In addition, the audio or visual distinguishing feature(s) may be toggled on and off in response to a user input.

In another embodiment, a recorded experience may display a timeline selectable to allow a user to jump to a selected time in the recorded experience, fast forward and rewind. When multiple users are viewing the recorded experience simultaneously, a new instance may be instantiated when playback of the recorded experience is modified by skipping a portion of the recorded experience, for example.

A recorded experience may be modified after it has been recorded. Objects may be deleted, an appearance of objects may be modified or a theme may be added to objects of the recorded experience, for example. The recorded experience may also be shortened or particular time sequences of the recorded experience may be removed.

As the number and type of events that are occurring in virtual worlds systems continues to increase, the desire to record and playback experiences will become more significant. The applications for such a method, system and apparatus are numerous. For example, a prospective buyer participating in a virtual house tour may wish to recall suggestions from a contractor who was present during the tour, participants of a wedding may wish to re-experience the event on their anniversary or students at a lecture may wish to attend the lecture a further time in order to refresh their knowledge.

There are several advantages to the method, system and apparatus described herein, some of which may have already been described. Unlike a video recording, which displays a successive series of images, the method of playing back a recorded experience described herein allows a user to navigate through the recorded experience rather than simply watch a video playback. In addition, the method of playing back a recorded experience allows for users to interact with other users who are also participating in the playback of the recorded experience. Another advantage of the method of playing back a recorded experience described herein is that, unlike video playback, the recorded experience is not limited by a point of view from which the recording was captured. Because a user is able to navigate through the recorded experience by changing their position and orientation within the recorded experience, they may view objects from any angle that they choose. As such playback of the same recorded experience may be different for all users.

The above-described embodiments are intended to be examples only. Alterations, modifications and variations can be effected to the particular embodiments by those of skill in the art without departing from the scope of the present application, which is defined solely by the claims appended hereto.

What is claimed is:

1. A method of providing a scene from a virtual world, the method comprising:
   instantiating through execution of one or more processors a plurality of instances of a scene in the virtual world, the plurality of instances defined by data from memory of a server, each of the plurality of instances supporting participation of at least one user by way of a client device;
   in response to the instantiating, retrieving at least one file from memory, the at least one file generated prior to the instantiating and having an initial state of the scene, subsequent changes to the scene during a time period of the scene, and positions of a plurality of objects within the initial state and subsequent changes of the scene; and rendering the scene in each of the plurality of instances for display by the client device of a first user of the at least one user, wherein:

a first human-controlled avatar of the first user may interact with the scene in a first instance of the plurality of instances during the time period of the scene by navigating around the plurality of objects; and a second human-controlled avatar of a second user of the at least one user may interact with the scene in a second instance of the plurality of instances during the time period of the scene by navigating around the plurality of objects.

2. The method of claim 1, wherein each of the plurality of instances of the scene are identical at instantiation.

3. The method of claim 1, wherein the subsequent changes to the initial scene state include changes to an object of the plurality of objects within the initial scene state.

4. The method of claim 1, wherein the subsequent changes to the initial scene state include changes to computer-generated representations of a character in the initial scene state.

5. The method of claim 1, wherein the scene includes audio and video images.

6. The method of claim 5, wherein the audio and video images of the scene are a concert.

7. The method of claim 5, wherein the audio and video images of the scene are a lecture.

8. The method of claim 1, wherein the first human-controlled avatar of the first user may interact with other avatars in the first instance.

9. The method of claim 1, wherein the scene is not modifiable by the first human-controlled avatar of the first user in the first instance.

10. The method of claim 1, wherein the scene is not modifiable by objects in the respective one of the plurality of instances.

11. The method of claim 1, wherein the scene is rendered in each of the plurality of instances of the scene at a particular time interval.

12. The method of claim 1, wherein collisions between objects and computer-generated representations of a character of the scene and objects and human-controlled avatars in each of the plurality of instances of the scene are allowed.

13. The method of claim 1, wherein collisions between objects and computer-generated representations of a character of the scene and objects and human-controlled avatars in each of the plurality of instances of the scene are not allowed.

14. The method of claim 3, wherein the plurality of objects in the scene may enter into each of the plurality of instances of the scene.

15. The method of claim 1, wherein the scene includes scripts that effectuate changes in each of the plurality of instances of the scene.

16. The method of claim 15, wherein the scripts execute in response to a user action.

17. The method of claim 15, wherein the scripts are executed at a particular time during the time period of the scene.

18. The method of claim 15, wherein the scripts execute in response to a trigger event.

19. The method of claim 1, wherein movement within each of the plurality of instances of the scene are limited by the rendering of the scene.

* * * * *